United States Patent
Sato

(10) Patent No.: US 10,008,295 B2
(45) Date of Patent: Jun. 26, 2018

(54) EMERGENCY CORE COOLING SYSTEM AND BOILING WATER NUCLEAR PLANT

(75) Inventor: Takashi Sato, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 1155 days.

(21) Appl. No.: 13/885,539

(22) PCT Filed: Sep. 14, 2011

(86) PCT No.: PCT/JP2011/005181
§ 371 (c)(1),
(2), (4) Date: May 15, 2013

(87) PCT Pub. No.: WO2012/066710
PCT Pub. Date: May 24, 2012

(65) Prior Publication Data
US 2013/0235966 A1 Sep. 12, 2013

(30) Foreign Application Priority Data
Nov. 16, 2010 (JP) ................. 2010-255815

(51) Int. Cl.
G21C 15/18 (2006.01)
G21D 1/02 (2006.01)
G21D 3/06 (2006.01)

(52) U.S. Cl.
CPC ............ *G21C 15/18* (2013.01); *G21D 1/02* (2013.01); *G21D 3/06* (2013.01); *Y02E 30/40* (2013.01)

(58) Field of Classification Search
CPC ............... G21C 15/18; G21C 15/182; G21C 2015/185; G21C 2015/187; G21D 3/04; G21D 3/06; G21Y 2004/304
See application file for complete search history.

(56) References Cited

U.S. PATENT DOCUMENTS

| 5,343,507 A | * | 8/1994 | Arnold | G21C 15/182 376/203 |
| 5,426,681 A | * | 6/1995 | Aburomia | G21C 9/004 376/282 |

(Continued)

FOREIGN PATENT DOCUMENTS

| JP | 04-216494 A | 8/1992 |
| JP | 2000-275380 A | 10/2000 |

(Continued)

*Primary Examiner* — Sharon M Davis
(74) *Attorney, Agent, or Firm* — Foley & Lardner LLP

(57) ABSTRACT

An emergency core cooling system is provided with at least four active safety divisions each equipped with a motor-driven active safety system, and at least one passive safety division equipped with passive system that does not require to be electrically driven. The number of active safety divisions is grater than the number of active safety divisions needed during a design basis accident by two or more, and each active safety division is provided with one motor-driven active safety system. The passive safety system can cool the reactor core without being re-supplied with cooling water from the outside during the time period needed for the active safety system subjected to online maintenance to recover if an accident occurred during online maintenance of one active safety system. In an emergency core cooling system for a boiling water nuclear power plant, it is possible to reduce the size of an emergency power source and the number of systems that lose the function caused by an auxiliary cooling system losing the function.

11 Claims, 9 Drawing Sheets

(56) References Cited

U.S. PATENT DOCUMENTS 5,896,434 A * 4/1999 Yoshizumi ............... G21D 1/02
                                                                        376/210
2008/0317193 A1 12/2008 Sato

FOREIGN PATENT DOCUMENTS

| JP | 2006-138680 A | 6/2006 |
| JP | 2008-281426 A | 11/2008 |

* cited by examiner

EMERGENCY CORE COOLING SYSTEM AND BOILING WATER NUCLEAR PLANT

TECHNICAL FIELD

The present invention relates to an emergency core cooling system and a boiling water nuclear plant provided with the emergency core cooling system.

BACKGROUND ART

[N+1 Safety Criterion and N+2 Safety Criterion]

There is specified a single failure criterion as the most general safety criterion applied to design of an emergency core cooling system (ECCS) of a conventional boiling water reactor. The single failure criterion assumes, in a safety assessment for a loss of coolant accident (LOCA) which is one of design basis accidents (DBA), occurrence of a single failure in an emergency core cooling system and requires that required cooling of the core is sufficiently performed even in a state where at least one emergency core cooling system is unable to function. Hereinafter, this criterion is referred to as N+1 criterion.

The emergency core cooling system of the conventional boiling water reactor is generally divided into two to four safety divisions. A plurality of systems are provided in one safety division, and electric power is supplied to the plurality of systems provided in one safety division from an emergency power source provided for each safety division.

In general, only one emergency power source is provided in one safety division, so that when a failure of the emergency power source is assumed to be the single failure, it is determined in the safety assessment that all motor-driven systems in the one safety division become unable to function. Actually, electric power is supplied from an offsite power system, so that the motor-driven systems in the one safety division do not become unable to function due to only the single failure of the emergency power source. However, the safety assessment is conservatively required to simultaneously assume a loss of the offsite power system. Thus, it is required to assume in the safety assessment that only the single failure of the emergency power source causes all the motor-driven systems in the one safety division to become unable to function.

The term "division" refers not only to a division corresponding to the emergency power source, but also to a special area defined by physical separation walls (fire walls or a water leak tight walls) formed against anticipated fire, flooding, and so on in a plant so as to isolate the influence of the anticipated events occurring in another division. That is, even if an event in which an emergency core cooling system corresponding to one division is disabled completely due to fire or flooding is assumed as the single failure, the plant is designed such that the single failure exercises no influence on another division. A division including a safety system is referred to as "safety division". A division not including the safety system but including a non-safety system is refereed to as "non-safety division".

In the single failure of the safety system, a loss of function of the one entire safety division results in the most severe decrease in safety function, so that the safety system single failure is assumed by selecting a component (e.g., emergency power source) or a cause (e.g., faire or flooding) that may bring about the loss of function of the one entire safety division.

When a failure in the emergency core cooling system has been found in a periodic inspection made during operation of the plant, operation is allowed to continue within about 7 to 10 days since the single failure has already occurred, and the operation of the plant is stopped if the failure cannot be resolved during the 7 to 10 days. This regulation is carried out by restricting an AOT (Allowed Outage Time) according to technical specifications. Thus, hereinafter, the above specification is referred to as AOT regulation.

The above safety design of the emergency core cooling system based on the N+1 criterion and restriction of plant operation based on the AOT regulation are carried out commonly in US and Japan. In these states, reliability of the emergency core cooling system is very high, and little failure occurs, so that the safety design and restriction of plant operation are applied as a rational and efficient method. On the other hand, the safety criterion of some European countries includes not only the single failure criterion, but also a criterion that requires an assumption of the function loss state of another safety division through on-line maintenance. This criterion is hereinafter referred to as N+2 criterion.

That is, the N+2 criterion requires that plant design is made on the assumption that there exists a failure in one component of the emergency core cooling system on a steady basis and that maintenance (on-line maintenance) is always performed during operation of the plant and requires carrying out of the safety design and safety assessment on the assumption that when a remaining system of the emergency core cooling system in a standby state is automatically started-up upon occurrence of the design base accident, another failure occurs. The N+2 criterion is a very safety-conscious safety criterion. Under the N+2 criterion, the on-line maintenance for only one emergency core cooling system can be performed for an indefinite time period. It follows that applying the N+2 criterion allows the maintenance for the emergency core cooling system to be performed entirely during operation of the plant, which may significantly contribute to a reduction in plant outage time period and enhancement of the safety during the plant outage time period.

Assume that a loss of coolant accident, which is one of the design basis accidents, has occurred under the N+2 criterion. More specifically, it is assumed that piping of one system of the emergency core cooling system is broken to generate the loss of coolant accident and that two emergency core cooling systems become unable to function due to the single failure and on-line maintenance. Thus, at least four systems of the emergency core cooling system are required. Further, the N+2 criterion assumes that two divisions become unable to function due to a signal failure and on-line maintenance, so that at least three divisions are required. When three active safety divisions are provided, two systems are required in one of the divisions and, further, symmetry needs to be considered, with the result that two emergency core cooling systems need to be provided for each safety division.

[Emergency Core Cooling System of "BWR72"]

An emergency core cooling system of "BWR72" in Germany is a representative example that meets the N+2 criterion by providing three active divisions. Hereinafter, with reference to FIG. 7, a configuration of the emergency core cooling system of the German "BWR72" will be described.

Referring to FIG. 7, the emergency core cooling system, having three active divisions, includes a motor-driven high pressure core injection system (HPCI) 25, a motor-driven low pressure core injection system (LPCI) 26, and an emergency diesel generator (EDG) 4 for each division. Two motor-driven systems are provided for each division and, correspondingly, a capacity of each emergency diesel generator 4 is large. Further, the emergency core cooling system is designed such that when a reactor component cooling water system (not illustrated) provided for each active safety division has become unable to function, the high pressure core injection system 25 and the low pressure core injection system 26 provided in a corresponding division become unable to function simultaneously. Thus, although a total number of the emergency core cooling systems is six, non-reliabilities of the reactor component cooling water systems provided in respective three divisions determine the entire reliability. Similarly, when the emergency diesel generator 4 for supplying electric power to each active safety division has failed, the high pressure core injection system 25 and the low pressure core injection system 26 provided in a corresponding division become unable to function simultaneously.

[Emergency Core Cooling System of "BWR75"]

As another representative example of the BWR designed under the N+2 criterion, there is known a "BWR75" in Sweden. Hereinafter, with reference to FIG. 8, an outline of the emergency core cooling system of the Swedish "BWR75" will be described.

Referring to FIG. 8, the emergency core cooling system, having four safety divisions, includes an auxiliary feed water system (AFS) 31, a low pressure core injection system 26 or a low pressure core spray system (LPCS) 32, a residual heat removal system (RHR), and an emergency diesel generator 4 for each safety division. The low pressure core injection system 26 or the low pressure core spray system 32 and the residual heat removal system are independently provided without sharing a pump. Since the residual heat removal system of the "BWR75" is dedicatedly used as a containment cooling system for cooling a wet well and a dry well of a containment vessel at a design basis accident, it is indicated as a wet well/dry well cooling system (WDCS) 24.

All the systems use motor-driven pumps, a total number of systems are as large as 12 and, correspondingly, a capacity of each emergency diesel generator 4 is large. Nevertheless, a plurality of motor-driven emergency core cooling systems provided for each active division all become unable to function due to a failure of the corresponding emergency diesel generator 4. Similarly, when a rector component cooling water system (not illustrated) provided for each active safety division has failed, all the emergency core cooling systems provided in the corresponding division become unable to function.

[Example in which Passive Safety Division is Provided in Addition to Active Safety Divisions Meeting N+2 Criterion]

As described above, the emergency core cooling system having the active divisions meeting the N+2 criterion has sufficient redundancy and is thus high in safety. On the other hand, there is known a technique of Patent Document 1 as an example in which a passive safety division is provided in addition to the active divisions meeting the N+2 criterion. A system in which the passive safety division is provided independently of the active safety divisions as described above so as to enhance safety further is referred to as an in-depth hybrid safety system.

This background art will be described based on FIG. 9. Referring to FIG. 9, there are first, second, and third safety divisions as the active safety divisions. A fourth division is a passive safety division. Each of the three active safety divisions includes a high pressure core cooling system (HPCF) 1, a low pressure core cooling system (LPFL) 2 which is also used as a residual heat removal system 3, and an emergency diesel generator 4 that supplies electric power to both the high pressure core cooling system 1 and the low pressure core cooling system 2. The passive safety division includes an isolation condenser (IC) 5, a passive containment cooling system (PCCS) 8, and a gravity-driven cooling system (GDCS) 9.

As a result, even if the emergency core cooling system having three active safety divisions becomes entirely unable to function due to natural disaster such as a giant earthquake or a giant tsunami, the safety of the reactor can be ensured by the emergency core cooling system of the passive safety division. However, two emergency core cooling systems are provided for each active safety division, resulting in six systems in total, which exceeds the minimum number (four, as described above) of systems required for the N+2 criterion.

Each emergency diesel generator 4 requires a large capacity of, e.g., about 5,000 kW due to need of supplying electric power to two emergency core cooling systems. As a result, a physical quantity of components and cost for the emergency core cooling system having the active safety divisions meeting the N+2 criterion are increased. The increase in the physical quantity of components correspondingly increases a volume of a reactor building housing the components. Further, addition of the fourth passive safety division also increases the physical quantity and cost of the entire emergency core cooling system. Furthermore, when a reactor component cooling water system (not illustrated) provided for each active safety division has become unable to function, both the high pressure core cooling system 1 and the low pressure core cooling system 2 are disabled, so that the non-reliability of all the active safety divisions is determined by the non-reliabilities of the reactor component cooling water systems provided in respective three divisions.

PRIOR ART DOCUMENTS

Patent Documents

Patent Document 1: Japanese Patent Application Laid-Open Publication No. 2008-281426

SUMMARY OF THE INVENTION

Problems to be Solved by the Invention

In the conventional emergency core cooling system meeting the N+2 criterion, a plurality of motor-driven systems are provided in one active safety division, and thus the capacity of the emergency diesel generator for supplying electric power to the plurality of motor-driven systems is increased. Further, the plurality of Systems in one active safety division are cooled by the single reactor component cooling water system, and thus a failure of the reactor component cooling water system in one division disables the plurality of systems in the corresponding division. Similarly, a failure of the emergency diesel generator in one division disables the plurality of systems in the corresponding division. Furthermore, a total number of the systems is as large as six to twelve, causing an increase in cost and volume of the reactor building.

As a result, the installation of the passive safety division in addition to the active safety divisions meeting the N+2 criterion further increases the cost and volume of the reactor building.

The present invention has been made to solve the above problems, and an object thereof is to provide an emergency core cooling system of a boiling water nuclear plant capable of reducing a size of the emergency power source, minimizing the number of motor-driven systems, and preventing the plurality of systems from becoming unable to function due to a loss of function of the reactor component cooling water system.

Means for Solving the Problem

In order to achieve the object described above, according to an aspect of the present invention, there is provided an emergency core cooling system of a boiling water nuclear plant, comprising: four or more active safety divisions each including a motor-driven active safety system; and one or more passive safety divisions including a passive safety system that does not require motor drive, wherein number of the active safety divisions is larger by two or more than number required upon occurrence of a design basis accident, one motor-driven active safety system and an emergency power source for supplying electric power to the motor-driven active safety system are provided for each active safety division, and when it is assumed that an accident has occurred while one active safety system is being subjected to on-line maintenance, the passive safety system can cool the core for a time period required for recovery of the active safety system subjected to the on-line maintenance without being replenished with cooling water from outside.

According to another aspect of the present invention, there is provided a boiling water nuclear plant provided with an emergency core cooling system, the emergency core cooling system including: four or more active safety divisions each including a motor-driven active safety system; and one or more passive safety divisions including a passive safety system that does not require motor drive, wherein number of the active safety divisions is larger by two or more than number required upon occurrence of a design basis accident, one motor-driven active safety system and an emergency power source for supplying a power source to the motor-driven active safety system are provided for each active safety division, and when it is assumed that an accident has occurred while one active safety system is being subjected to on-line maintenance, the passive safety system can cool the core for a time period required for recovery of the active safety system subjected to the on-line maintenance without being replenished with cooling water from outside.

Advantages of the Invention

According to the present invention, there can be provided an emergency core cooling system of a boiling water nuclear plant capable of reducing a size of the emergency power source, minimizing the number of motor-driven systems, and preventing the plurality of systems from becoming unable to function due to a loss of function of the reactor component cooling water system.

EMBODIMENTS FOR CARRYING OUT THE INVENTION

Figure 7:
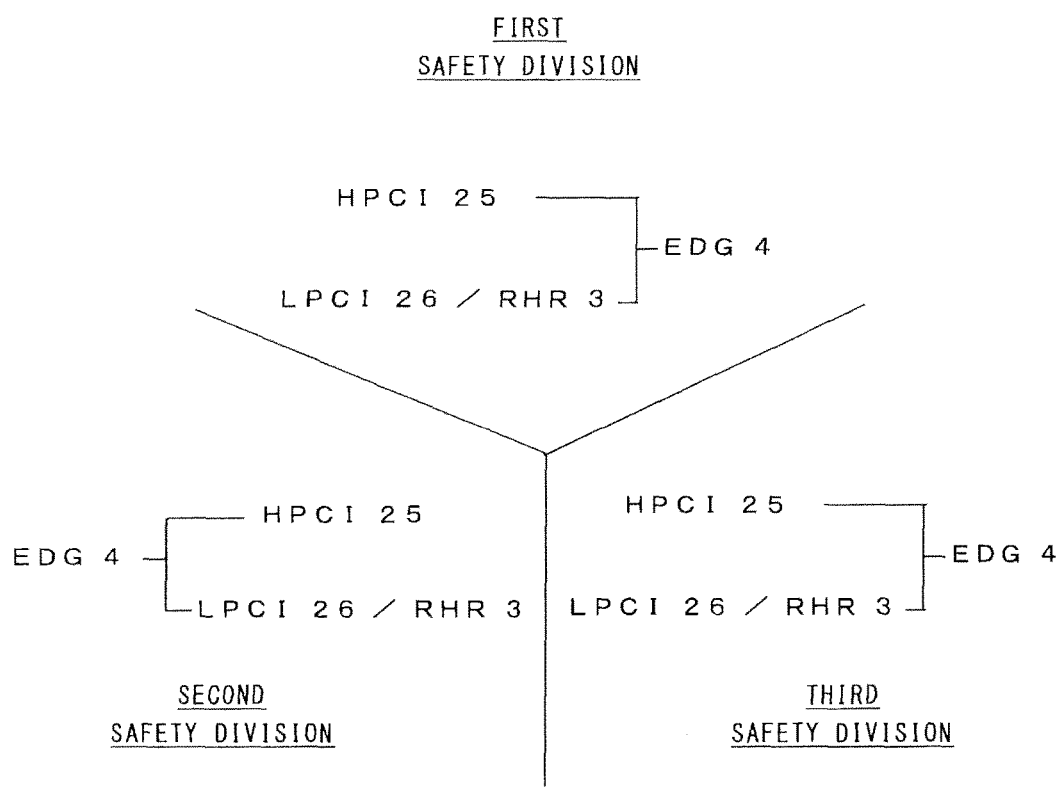
FIG. 7 is an explanatory view illustrating an entire configuration of a conventional emergency core cooling system of "BWR72".
Figure 8:
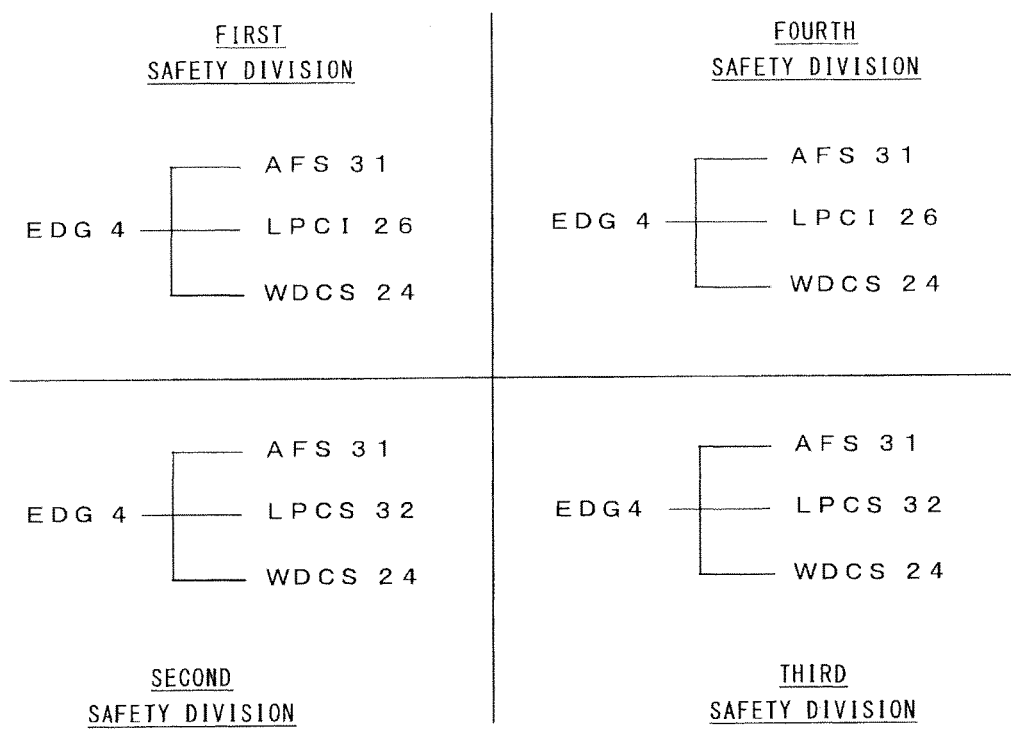
FIG. 8 is an explanatory view illustrating an entire configuration of a conventional emergency core cooling system of "BWR75".
Figure 9:
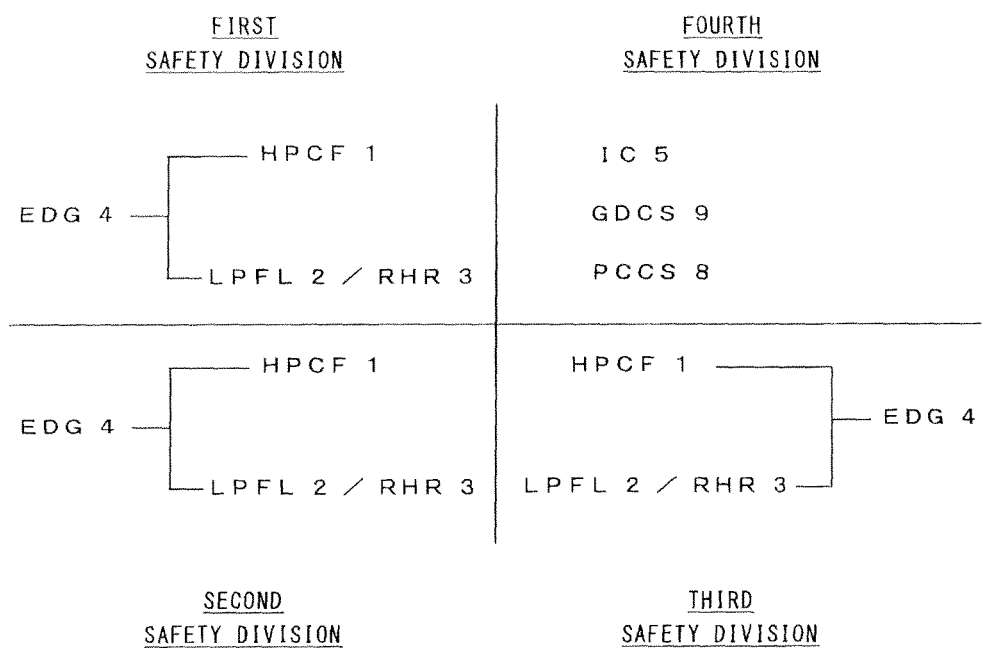
FIG. 9 is an explanatory view illustrating an entire configuration of a conventional emergency core cooling system of an in-depth hybrid safety system meeting N+2 criterion.

Embodiments of an emergency core cooling system according to the present invention will be described below with reference to FIGS. 1 to 6. The same reference numerals are given to the same components as in FIGS. 7 to 9, so a description thereof will be omitted and only the essential elements will be explained.

First Embodiment

A first embodiment of an emergency core cooling system according to the present invention will be described with reference to FIG. 1.

Figure 1:
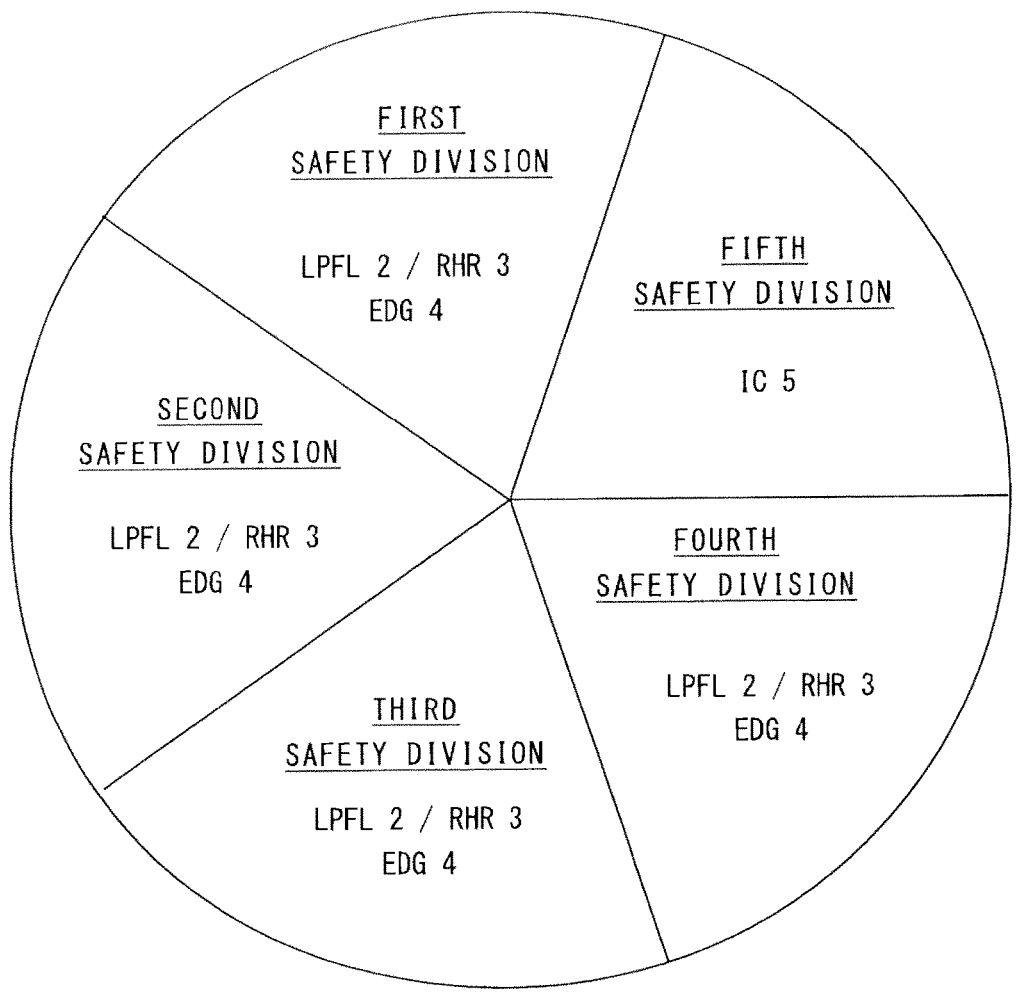
FIG. 1 is an explanatory view illustrating an entire configuration of a first embodiment of an emergency core cooling system according to the present invention.

FIG. 1 illustrates a configuration of the emergency core cooling system according to the first embodiment of the present invention. The emergency core cooling system according to the present embodiment has five safety divisions: first to fourth safety divisions which are exclusively used for an active emergency core cooling system and a fifth safety division including a passive emergency core cooling system. Each of the first to fourth safety divisions exclusively used, for the active emergency core cooling system is provided with a low pressure core cooling system (LPFL) 2 as a motor-driven low pressure core cooling system, a residual heat removal system (RHR) 3 that shares some pumps and pipes with the low pressure core cooling system 2, and an emergency diesel generator (EDG) 4 as an emergency power source. Since some pumps and pipes are shared between the low pressure core cooling system 2 and the residual heat removal system 3, they are indicated as "LPFL 2/RHR 3" in FIG. 1.

Further, although not illustrated, an automatic depressurization system (ADS) is provided as a means for depressurizing the reactor. The automatic depressurization system is a system that automatically opens a plurality of safety relief valves upon occurrence of a small diameter pipe break to depressurize the reactor, and it is provided in a conventional boiling water nuclear reactor as well.

The low pressure core cooling system 2, the residual heat removal system 3, the emergency diesel generator 4, and the automatic depressurization system have the same structures as those in the conventional emergency core cooling system of an advanced BWR (ABWR) (see Patent Document 1).

The low pressure core cooling system 2 has 100% of an injection capacity required for cooling the core upon occurrence of a loss of coolant accident, which is a design basis accident. Thus, only one low pressure core cooling system 2 can safely cool the core within its specified operating pressure. The specified operating pressure of the low pressure core cooling system 2 is lower than the normal operating pressure of the reactor and is, e.g., 17 kg/cm$^2$ (about 1.7 MPa).

The residual heat removal system 3 of each division has a heat removal capacity of at least 50% of the heat removal amount required for cooling the core and the containment vessel upon occurrence of the design basis accident. That is, in order to provide 100% of the heat removal amount required for cooling the core and the containment vessel upon occurrence of a design basis accident, it is necessary to activate the residual heat removal systems 3 in at least any two of the four active safety divisions.

Thus, in the present embodiment, a minimum division number N required upon occurrence of the design basis accident is 2.

It goes without saying that an emergency gas turbine generator (GTG) can be used in place of the emergency diesel generator 4. The emergency gas turbine generator has no cooling water system and thus can provide higher reliability than the emergency diesel generator 4 that requires the cooling water system. Further, an emergency power source provided for each safety division may have a capacity of 2×50% in place of 1×100%, which means, for example, that two small-sized power sources may be provided.

The low pressure core cooling system 2 may be replaced with any other motor-driven low pressure emergency core cooling systems.

The fifth safety division including the passive emergency core cooling system is provided with an isolation condenser (IC) 5. The isolation condenser 5 has the same structure as that in a conventional ESBWR (Economical and Simplified BWR) (see Patent Document 1).

The isolation condenser 5 has a large capacity cooling water source (e.g., 1500 m$^3$) so as to remove decay heat for about three to seven days. The wide range of the cooling period stems from a difference in the decay heat which is caused depending on plant output power. For example, when the emergency core cooling system according to the present embodiment is applied to a 600,000 kWe class BWR, the core can be cooled for about seven days, and when the emergency core cooling system is applied to a 1,200,000 kWe class BWR, the core can be cooled for about three days. It goes without saying that when the capacity of the cooling water is increased, it is possible to ensure a cooling period of three days or more for a 1,800,000 kWe class BWR.

One of the features of the first embodiment that make it different from the conventional example resides in that the four low pressure core cooling systems constitute an in-depth hybrid safety system having five divisions capable of meeting the N+2 criterion.

For example, assuming that a pipe break accident has occurred in the low pressure core cooling system 2 of the first safety division as the loss of coolant accident which is design basis accident, it is required to assume in the N+2 criterion that a single failure occurs in the emergency diesel generator 4 of the second safety division, that the on-line maintenance is being performed for the emergency diesel generator 4 of the third safety division, and that the offsite power is lost. Even in this case, the low pressure core cooling system 2 and operation of the emergency diesel generator 4 of the fourth safety division are kept in an operable state, thereby ensuring 100% of an injection capacity required for cooling the core. Further, the residual heat removal systems 3 of the first and the fourth safety divisions can be used to achieve 100% or more cooling since the residual heat removal system 3 of each division has the heat removal capacity of 50% or more required for cooling the core and the containment vessel.

Further, assume that the emergency core cooling system of the first safety division has become unable to function due to external fire. In this case, even when it is assumed that a single failure occurs in the emergency diesel generator 4 of the second safety division and that the on-line maintenance is being performed for the emergency diesel generator 4 of the third safety division, cooling of the containment vessel and the core can be continued for a long period of time by the residual heat removal system 3 of the fourth safety division and the isolation condenser 5 of the fifth safety division. Thus, restoration of the emergency diesel generators 4 of the second and the third safety divisions and recovery of the offsite power are expected during the cooling operation and, thereafter, cold shutdown of the reactor can be achieved.

Further, even if a station blackout (SBO) in which the offsite power is lost and all the four emergency diesel generators 4 are failed has occurred due to a severe natural phenomenon, such as a giant earthquake or a mega hurricane, that exceeds design conditions, it is possible to safely continue cooling of the core for a long period of time by the isolation condenser 5 provided in the fifth safety division. During the cooling operation, recovery of the offsite power and restoration of the emergency diesel generators 4 can be achieved, so that the subsequent cold shutdown of the reactor can be safely achieved. Thus, the isolation condenser 5 is a passive cooling facility absolutely requiring no AC power supply for operation, so that the emergency core cooling system of the first embodiment having the isolation condenser 5 in addition to the active emergency core cooling systems of the four divisions can ensure extremely high in-depth hybrid safety.

As described above, the isolation condenser 5 holds cooling water enough for cooling the core for at least 8 hours (about three to or seven days in practice) alone without being replenished with cooling water from outside. Thus, the restoration of the emergency power source being subjected to the on-line maintenance or active emergency core cooling system is expected during the long cooling period.

Further, even if a loss of feed water or a transient change in which the reactor is isolated, the cooling of the reactor can be continued safely by the isolation condenser 5. Further, in the thus configured first embodiment according to the present invention, the emergency diesel generators 4 of the first to fourth safety divisions is each designed to supply electric power to only one low pressure core cooling system 2, thereby being reduced in electric power to about 3,000 kW.

Further, when it is assumed that fire has occurred in the first safety division, that a single failure has occurred in the emergency diesel generator 4 of the second safety division, that the emergency diesel generator 4 of the third safety division is being subjected to the on-line maintenance, and that hot shutdown of the reactor is carried out by the isolation condenser 5 of the fifth safety division, a further assumption is made such that open sticking of a safety relief valve has occurred. Even in this case, in the present embodiment, the core and the containment vessel can be cooled by the low pressure core cooling system 2/residual heat removal system 3 of the fourth safety division, thereby ensuring safety of the public.

Further, as to the active emergency core cooling system, the number of the low pressure core cooling systems 2 becomes four which is the minimum required number, thereby reducing a volume of a building for housing the low pressure core cooling systems 2 and the like. Although the number of the low pressure core cooling systems 2 is only four which is the minimum required number as described above, the number of the low pressure core cooling systems 2 that will become unable to function is limited to one even if a reactor component cooling water system of each active division has failed. That is, the plurality of low pressure core cooling systems 2 are prevented from becoming unable to function simultaneously in a manner dependent on a single failure of the reactor component cooling water system.

According to the present embodiment, there can be provided a highly-reliable in-depth hybrid safety system most suitable for a next generation BWR plant by combining the passive safety system and the active emergency core cooling system. More specifically, for an external event which is one residual risk for the BWR having high safety against an internal event, safety is ensured by diversity of the passive safety system during operation time period and by redundancy of the active emergency core cooling system that meets the N+2 criterion at plant stop time period, thereby achieving a next generation BWR with high safety enough to reduce the residual risk caused by severe natural phenomenon such as giant earthquake or mega hurricane or external fire to substantially zero.

Further, according to the present embodiment, only one low pressure core cooling system is provided as the motor-driven emergency core cooling system to be provided in each active safety division, thereby allowing a capacity of the emergency power source to be minimized and allowing the number of the emergency core cooling systems that will become unable to function due to a failure of the reactor component cooling water system to be minimized. When compared with a conventional in-depth hybrid safety system, the number of the motor-driven emergency core cooling systems can be reduced from six to four, so that the volume of the building housing these systems can also be reduced.

Second Embodiment

Figure 2:
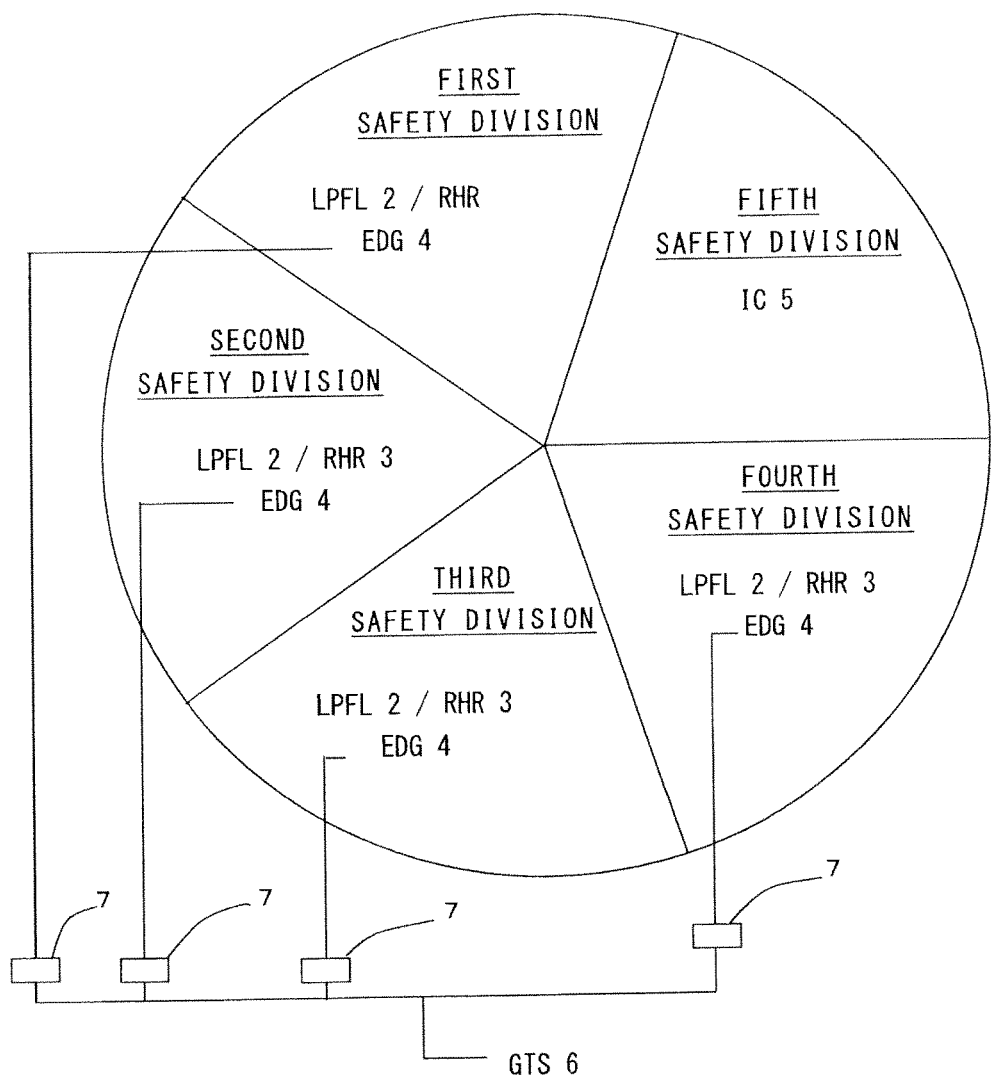
FIG. 2 is an explanatory view illustrating an entire configuration of a second embodiment of the emergency core cooling system according to the present invention.

FIG. 2 illustrates a configuration of the emergency core cooling system according to a second embodiment of the present invention. In the present embodiment, only one gas turbine generator 6 which is an auxiliary power source is provided so as to be shared among all the safety divisions exclusively used for the active emergency core cooling system, thereby selectively supplying electric power to any one of the safety divisions. In order for the electric power to be selectively supplied to any one of the safety divisions, switching gears 7 for switching electric power supply are provided across a bus line between the gas turbine generator and each active safety division.

According to the thus configured present embodiment, safety against the station blackout during plant operation can be enhanced. Further, diversity of the electric power supply can be ensured even when core cooling is performed by only the four active safety divisions at plant stop time period, so that even if a severe natural phenomenon, such as a giant earthquake or a mega hurricane has occurred at plant stop time period, it is possible to significantly reduce the risk of occurrence of core damage.

Third Embodiment

Figure 3:
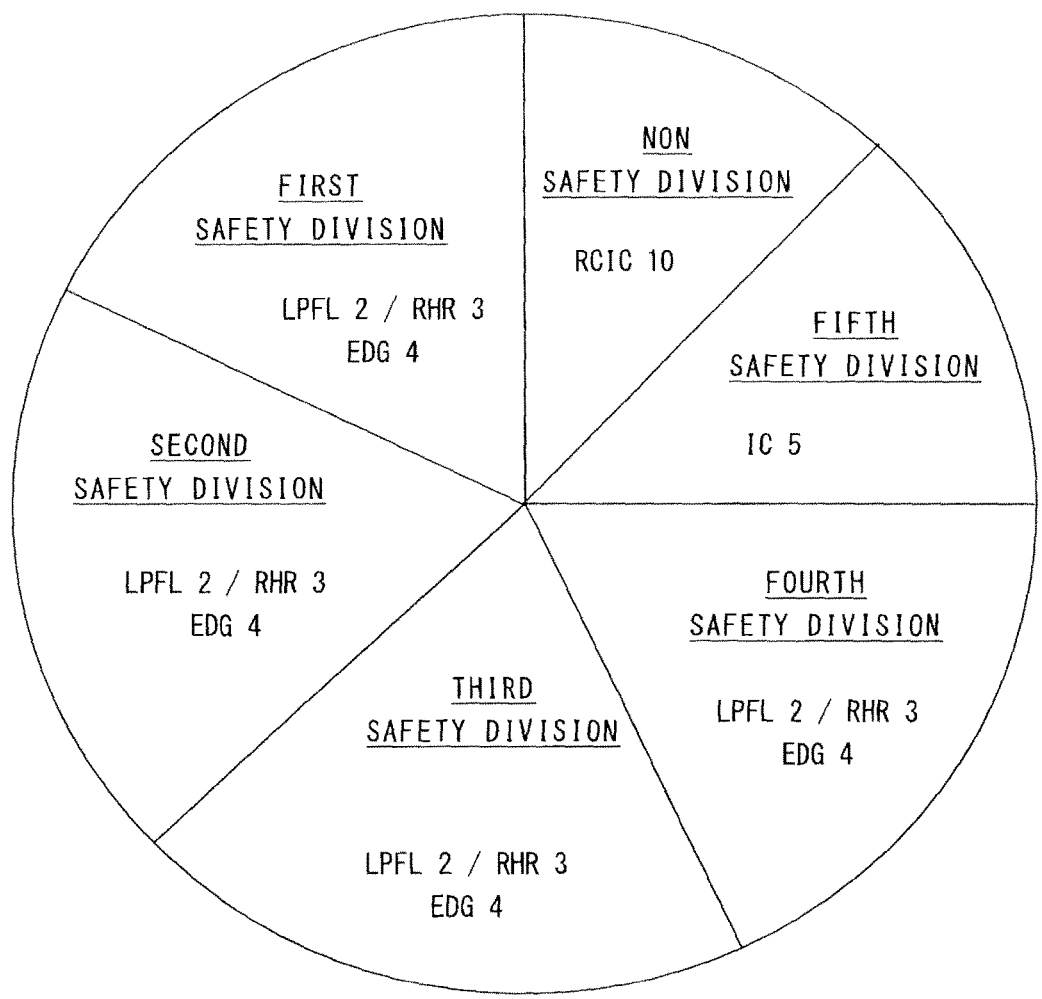
FIG. 3 is an explanatory view illustrating an entire configuration of a third embodiment of the emergency core cooling system according to the present invention.

FIG. 3 illustrates a configuration of the emergency core cooling system according to a third embodiment of the present invention. In the present embodiment, a reactor core isolation cooling system (RCIC) 10 which is a turbine-driven auxiliary feed water system in a non-safety division. The reactor core isolation cooling system 10 runs using reactor main steam as a power source and thus does not require the emergency diesel generator 4 for running thereof. Further, the reactor core isolation cooling system 10 need not be cooled by the reactor component cooling water system and can thus be provided in the non-safety division alone.

In the present embodiment, presence of the reactor core isolation cooling system 10 allows a reactor water level to be maintained safely even if the open sticking of the safety relief valve has occurred. Further, even if a small break loss of coolant accident has occurred, it is possible to maintain the reactor water level and cool the core without depressurizing the reactor.

Although the reactor core isolation cooling system 10 is the non-safety system, it may be provided in the first to fourth active safety divisions. Even in this case, the reactor core isolation cooling system 10 does not require AC power for running thereof, so that a capacity of the emergency diesel generator 4 need not be increased. Further, the reactor core isolation cooling system 10 may be provided in the fifth passive safety division. An increase in the number of the reactor core isolation cooling systems 10 correspondingly enhances reliability of the emergency core cooling system.

Fourth Embodiment

Figure 4:
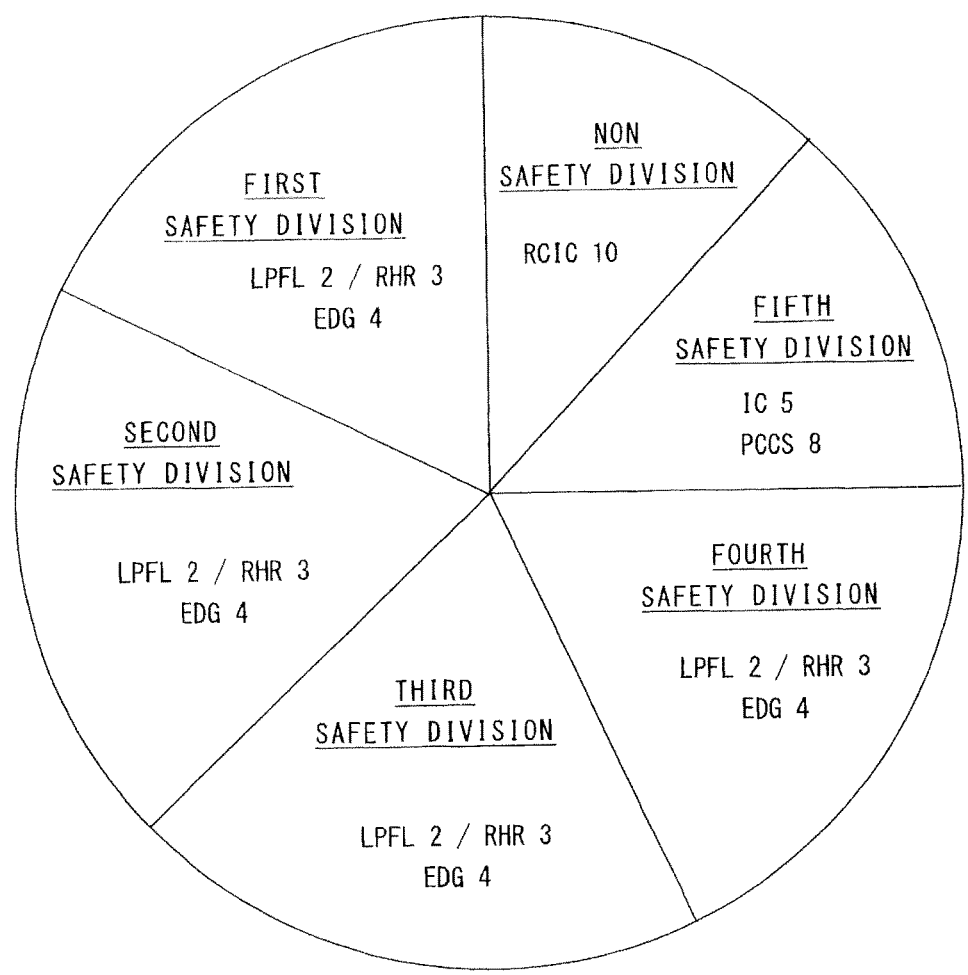
FIG. 4 is an explanatory view illustrating an entire configuration of a fourth embodiment of the emergency core cooling system according to the present invention.

FIG. 4 illustrates a configuration of the emergency core cooling system according to a fourth embodiment of the present invention. In the present embodiment, in addition to the isolation condenser 5, a passive containment cooling system (PCCS) 8 is provided in the fifth safety division including the passive emergency core cooling system. The passive containment cooling system 8 has the same structure as that in the conventional ESBWR. The passive containment cooling system 8 is composed of only passive safety components and absolutely requires no electric power source. Furthermore, the passive containment cooling system 8 does not require at all the cooling of the secondary side with an active safety component such as the reactor component cooling water system.

Thus, the passive containment cooling system 8 can cool the containment vessel with extremely high reliability even if a severe natural phenomenon, such as a giant earthquake or a mega hurricane has occurred to damage all facilities such as the offsite power, the emergency power source, and the reactor component cooling water system. That is, the passive containment cooling system 8 provides very excellent diversity for the containment vessel cooling function of the residual heat removal system 3. Thus, according to the emergency core cooling system of the present embodiment, high safety can be ensured in the cooling of the containment vessel even if a severe natural phenomenon has occurred.

Fourth Embodiment

Figure 5:
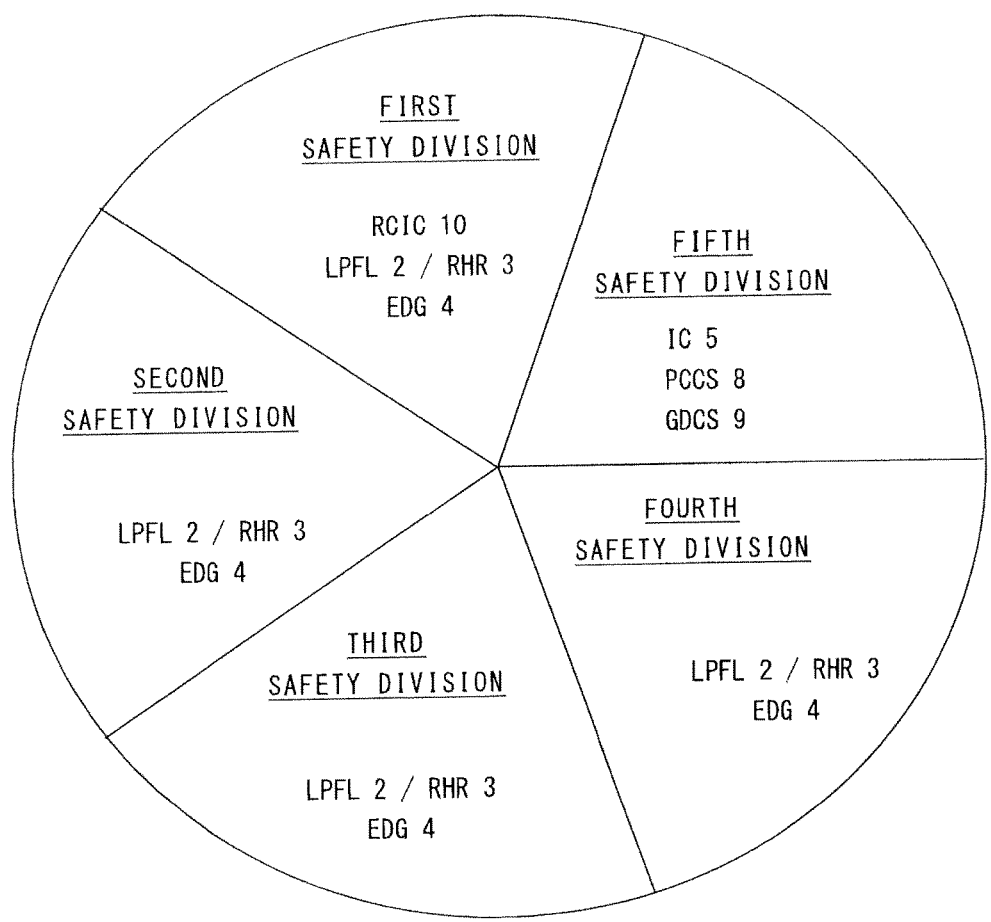
FIG. 5 is an explanatory view illustrating an entire configuration of a fifth embodiment of the emergency core cooling system according to the present invention.

FIG. 5 illustrates a configuration of the emergency core cooling system according to a fifth embodiment of the present invention. In the present embodiment, in addition to the isolation condenser 5 and the passive containment cooling system 8, a gravity-driven cooling system (GDCS) 9 is provided in the fifth safety division including the passive emergency core cooling system.

The gravity-driven cooling system 9 has the same structure as that in the conventional ESBWR. The gravity-driven cooling system 9 does not require at all auxiliary facilities such as the power source and the reactor component cooling water system for running thereof. Thus, even if a long-term station blackout has occurred due to a severe natural phenomenon, such as a giant earthquake or a mega hurricane and further the isolation condenser 5 has become unable to function for some reason to result in a core damage accident, cooling water in the gravity-driven cooling system 9 can be made to fall into a lower portion of the containment vessel. As a result, core debris can be flooded and cooled.

During the cooling of the flooded core debris, steam corresponding to the decay heat is generated, and the steam is sucked into the passive containment cooling system 8 due to its own pressure. Thereafter, the steam is cooled and condensed, and then, the condensate drains into a cooling water pool (not illustrated) of the gravity-driven cooling system 9 due to the gravity. Thus, the condensed water can be used again for cooling the core debris as the cooling water of the gravity-driven cooling system 9.

The BWR adopting the thus configured emergency core cooling system of the present embodiment can cool the containment vessel and maintain soundness thereof in a more reliable manner even if the core damage accident has occurred due to a severe natural phenomenon and can extremely reduce a risk from the natural phenomenon as compared to the conventional BWR. Imparting the passive cooling function of the containment vessel achieved by the passive containment cooling system 8 and the gravity-driven cooling system 9 reduces the risk resulting from the natural phenomenon to substantially zero.

Sixth Embodiment

Figure 6:
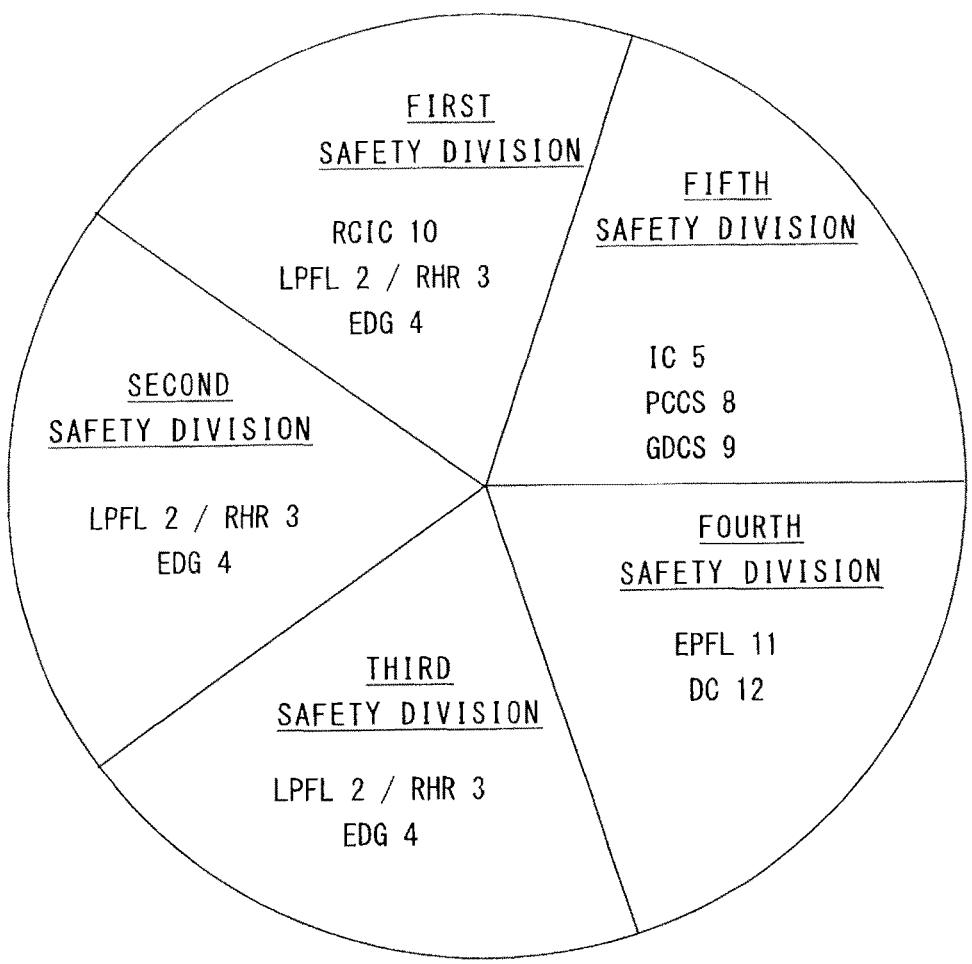
FIG. 6 is an explanatory view illustrating an entire configuration of a sixth embodiment of the emergency core cooling system according to the present invention.

FIG. 6 illustrates a configuration of the emergency core cooling system according to a sixth embodiment of the present invention. In FIG. 6, a DC (Direct Current)-driven equalized pressure flooder system (EPLF) 11 and a DC power source 12 are provided in the fourth safety division. The equalized pressure flooder system 11 has the same core cooling function as the low pressure core cooling system 2 in an equalized pressure state where a reactor pressure is almost equal to a pressure of the containment vessel. As a result, the number of the residual heat removal systems 3 is reduced to three; however, the containment vessel can be cooled by the passive containment cooling system 8 at accident time. That is, four systems are provided as the means for cooling the containment vessel, and thus the N+2 criterion is met.

According to the present embodiment, even a configuration including three active divisions, which are first to third active divisions, each including the low pressure core cooling system 2/residual heat removal system 3 and meeting only the N+1 criterion can meet the N+2 criterion by being added with a fourth active division including the equalized pressure flooder system ill an the d DC power source 12. For example, a run time of the DC power source 12 is set to 24 hours, and restoration of the emergency diesel generator 4 of another active safety division and recovery of the offsite power are expected during the run time.

Other Embodiments

The above-described embodiments are merely illustrative, and the present invention is not limited thereto.

For example, although the number N of the active safety systems required upon occurrence of the design basis accident is set to two and the number of the active safety divisions is set to four in the above embodiments, the number of the active safety divisions may be N+2 or more in general. Further, the number of the passive safety divisions may be one or more.

EXPLANATION OF SYMBOLS

1: High pressure core cooling system (HPCF)
2: Low pressure core cooling system (LPFL)
3: Residual heat removal system (RHR)
4: Emergency diesel generator (EDG)
5: Isolation condenser (IC)
6: Gas turbine generator (GTG)
7: Switching gear
8: Passive containment cooling system (PCCS)
9: Gravity-driven cooling system (GDCS)
10: Reactor core isolation cooling system (RCIC)
11: Equalized pressure flooder system (EPFL)
12: Direct current power source
24: Wet well/dry well cooling system (WDCS)
25: High pressure core injection system (HPCI)
26: Low pressure core injection system (LPCI)
31: Auxiliary feed water system (AFS)
32: Low pressure core spray system (LPCS)

The invention claimed is:

1. An emergency core cooling system of a boiling water nuclear plant, comprising:
   four active safety divisions exclusively used for an active emergency core cooling system, each of the active safety divisions including only one motor-driven low pressure core cooling system so as to reduce a volume of a building housing the low pressure core cooling system; and
   one or more passive safety divisions including a passive safety system that does not require motor drive, wherein
   a number of the active safety divisions is larger by two or more than a number required upon occurrence of a design basis accident,
   each of the active safety divisions includes an emergency power source for supplying electric power to the motor-driven low pressure core cooling system, and
   the passive safety system is configured to cool a core of the boiling water nuclear plant for at least 8 hours during an accident without being replenished with cooling water from outside.

2. The emergency core cooling system according to claim 1, wherein
   a number of the passive safety divisions is one,
   the only one motor-driven low pressure core cooling system of each of the active safety divisions exclusively used for the active emergency core cooling system is a low pressure core cooling system that is also used as a residual heat removal system,
   the low pressure core cooling system has at least 100% of an injection capacity required for cooling the core upon occurrence of at least the design basis accident in a state where a reactor pressure is low,
   the residual heat removal system has at least 50% of a heat removal capacity required for cooling the core and a containment vessel upon occurrence of the design basis accident, and
   the passive safety division includes at least an isolation condenser.

3. The emergency core cooling system according to claim 1, wherein
the emergency power source of each of the active safety divisions is an emergency diesel generator.

4. The emergency core cooling system according to claim 1, further comprising
at least one auxiliary power source configured to selectively supply power to any one of the active safety divisions.

5. The emergency core cooling system according to claim 4, wherein
the auxiliary power source is a gas turbine generator.

6. The emergency core cooling system according to claim 1, further comprising:
an auxiliary feed water system including one or more turbine-driven reactor core isolation cooling systems driven by main steam supplied from the boiling water reactor.

7. The emergency core cooling system according to claim 1, wherein
the passive safety division includes a passive containment cooling system.

8. The emergency core cooling system according to claim 7, wherein
the passive safety division includes a gravity-driven cooling system.

9. The emergency core cooling system according to claim 7, wherein
at least one of the active safety divisions includes a direct current power source and an equalized pressure flooder system driven by the direct current power source.

10. The emergency core cooling system according to claim 1, wherein
the passive safety system includes at least one isolation condenser that holds a predetermined volume of cooling water, the predetermined volume configured to cool the core of the boiling water nuclear plant for at least 8 hours during the accident without being replenished with cooling water from outside.

11. A boiling water nuclear plant provided with an emergency core cooling system, the emergency core cooling system including:
four active safety divisions exclusively used for an active emergency core cooling system, each of the active safety divisions including only one motor-driven low pressure core cooling system so as to reduce a volume of a building housing the low pressure core cooling system; and
one or more passive safety divisions including a passive safety system that does not require motor drive, wherein
a number of the active safety divisions is larger by two or more than a number required upon occurrence of a design basis accident,
each of the active safety divisions includes an emergency power source for supplying electric power to the motor-driven low pressure active safety system, and
the passive safety system is configured to cool a core of the boiling water nuclear plant for at least 8 hours during an accident without being replenished with cooling water from outside.

\* \* \* \* \*